(12) United States Patent
Fukui

(10) Patent No.: US 7,089,015 B2
(45) Date of Patent: Aug. 8, 2006

(54) METHOD FOR REPORTING THE QUALITY OF A TRANSMISSION CHANNEL BETWEEN A TRANSMITTER AND A RECEIVER

(75) Inventor: Noriyuki Fukui, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 230 days.

(21) Appl. No.: 10/619,444

(22) Filed: Jul. 16, 2003

(65) Prior Publication Data

US 2004/0067757 A1 Apr. 8, 2004

(30) Foreign Application Priority Data

Aug. 6, 2002 (EP) .................................. 02091972

(51) Int. Cl.
*H04Q 7/20* (2006.01)
(52) U.S. Cl. ...................................... 455/450; 455/453
(58) Field of Classification Search ................ 455/450, 455/453, 115.3
See application file for complete search history.

(56) References Cited

U.S. PATENT DOCUMENTS

| | | | | |
|---|---|---|---|---|
| 6,631,127 B1 * | 10/2003 | Ahmed et al. | .............. | 370/349 |
| 2002/0168945 A1 * | 11/2002 | Hwang et al. | ................ | 455/69 |
| 2002/0168946 A1 * | 11/2002 | Aizawa et al. | ................ | 455/82 |
| 2003/0022629 A1 * | 1/2003 | Miyoshi et al. | ............ | 455/67.3 |
| 2003/0210668 A1 * | 11/2003 | Malladi et al. | ............. | 370/335 |
| 2004/0005903 A1 * | 1/2004 | Dick et al. | ................... | 455/513 |

FOREIGN PATENT DOCUMENTS

| | | |
|---|---|---|
| EP | 0 797 327 A2 | 9/1997 |
| EP | 1 168 703 A2 | 1/2002 |
| WO | WO 01/91358 A1 | 11/2001 |

* cited by examiner

*Primary Examiner*—Lester G. Kincaid
*Assistant Examiner*—Marivelisse Santiago-Cordero
(74) *Attorney, Agent, or Firm*—Oblon, Spivak, McClelland, Maier & Neustadt, P.C.

(57) ABSTRACT

A method for reporting a quality of a transmission channel between a transmitter and a receiver includes transmitting frames of data from said transmitter over the transmission channel to the receiver, sending back from the receiver to the transmitter a non-acknowledgement information when a frame of data received by the receiver is detected as erroneous, sending from the receiver to the transmitter, at scheduled reporting times, an information representative of the quality of the transmission channel at the reporting times, and sending in a same subframe the non-acknowledgement information from the receiver back to the transmitter together with information representative of the quality of the transmission channel at a time the non-acknowledgement information is sent, the time being different than the reporting times.

3 Claims, 5 Drawing Sheets

METHOD FOR REPORTING THE QUALITY OF A TRANSMISSION CHANNEL BETWEEN A TRANSMITTER AND A RECEIVER

FIELD OF THE INVENTION

The present invention relates to a method for reporting the quality of a transmission channel between a transmitter and a receiver. The invention can be applied, in particular, to a mobile telecommunication system supporting HSDPA.

BACKGROUND OF THE INVENTION

It has been recently proposed within the framework of the 3GPP forum to enhance the Universal Mobile Telecommunication System (UMTS) with a High Speed Downlink Packet Access (HSDPA). The new functionality is aimed at enabling a fast access to packet services through a new transport channel called HS-DSCH for High Speed-Downlink Shared Channel. The physical channels to which the HS-DSCH is mapped, also called HS-PDSCHs (for High Speed Physical Downlink Shared Channels) can be shared by users in the time domain as well as in the code domain. According to his needs, a user is allocated on or more channeling codes (or spreading codes) within the HS-DSCH. Furthermore, the HS-DSCH channel is expected to support Hybrid ARQ and to be capable of accomodating different rates and channel conditions by using Adaptive Modulation and Coding (AMC) schemes.

FIG. 1 represents schematically the channels involved in an HSDPA access. There are basically provided fifteen HS-PDSCH channels intended for the transmission of data from the base station (Node B) to the different user equipments (UEs), four channels called HS-SCCHs (for High Speed Shared Control CHannels) carrying the associated downlink signalling and one uplink channel called HS-DPCCH (for High Speed Dedicated Physical Control CHannel) capable of carrying a feedback information to the base station. The data sub-frames for the differents UEs can be code- and time-multiplexed over the HS-PDSCH channels. More specifically, in a given TTI (Transmission Time Interval) the HS-PDSCH channels can simultaneously accomodate one user to fifteen users. A more complete description of the shared channels in HSDPA can be found in the 3GPP specification TR 25.858 v.5.0.0 which is hereby incorporated by reference.

FIG. 2 shows the process of receiving data from a base station over an HSDPA access. The above mentioned HS-SCCH channels numbered 0 to 3 have been represented in the upper part of the figure while the HS-PDSCH channels numbered 0 to 14 and the HS-DPCCH channel have been represented below. All the channels are subjected to an identical time division into so-called TTIs (for Time Transmission Interval), each TTI corresponding to 3 timeslots in UMTS-FDD (UMTS Frequency Division Duplex). On the other hand, a radio frame is divided into five subframes, a subframe being transmitted during one TTI. A subframe carried by an HS-SCCH channel is called a signalling subframe and a subframe carried by an HS-PDSCH channel is called a data subframe. For example reference numbers 210 to 260 indicate signalling subframes and 211 to 261 indicate data subframes.

The UE monitors the HS-SCCHs channels and checks with its UE ID (UE IDentifier) whether a signalling subframe is assigned to the user. In the affirmative, the UE determines from the content of the signalling subframe the HS-PDSCH channel (among channels HS-PDSCH#0 to HS-PDSCH#14) which carries the data subframe intended to the user. For example, signalling subframe 220 indicates that HS-PDSCH#1 carries a data subframe 221 for the user in question.

The UE checks whether the user data contained in the data subframe are erroneous. If they are not, an acknowledgement indication ACK is transmitted over the HS-DPCCH to the base station, else a negative acknowledgement NACK is sent back in the same way and the base station then retransmits the user data at a later time.

In order to enable the base station to adapt the coding rate and/or the modulation type/order to the transmission conditions, each UE reports at regular intervals the measurement of a parameter representative of the quality of the transmission channel, denoted CQI for Channel Quality Indicator, hereafter referred to as CQI information. For example, if the quality of the transmission is poor, the base station may increase the transmission power, choose a lower coding rate and/or a lower modulation order and, conversely, if the quality of the transmission is high, the base station may choose a higher coding rate and/or a higher modulation order. In practice, the CQI information is coded as a binary word and transmitted to the base station over the HS-PDSCH channel.

FIG. 3 represents schematically the frame structure of the HS-DPCCH channel. Such a frame has a total duration Tf=10 ms and is divided into five TTIs like TTIs 310 to 350, each TTI consisting of 3 timeslots (of duration Ts). A subframe is carried in one TTI and may contain an ACK/NACK information and/or a CQI information. It should be noted that the ACK/NACK information and the CQI information are transmitted independently from each other and that a subframe may contain both information, none of them, or only one of them. More precisely, the ACK/NACK information is transmitted each time the UE receives a data subframe from the base station over the HSPDA access while a CQI information is transmitted at scheduled, periodically distributed transmission times, the determination of which is described into details in the 3GPP specification TS 25.214 v.5.1.0, paragraph 7. The reporting period Tr separating two consecutive reporting times is signalled to the UE by a higher protocol layer and may take different values which are expressed as a number of subframes, namely 1, 5, 10, 20, 40 or 80 subframes.

FIG. 4 schematically shows a time chart of the reporting of a CQI information. The UE estimated the quality of the transmission channel at times $t_0$, $t_1$, $t_2$, etc. and reports these estimates as a CQI information at times $t'_0$, $t'_1$, $t'_2$ distributed at regular intervals Tr. The CQI is typically measured from received pilot symbols transmitted by the base station over the primary CPICH (Common PIlot CHannel) or over a secondary CPICH if beamforming is used. The transmission of the pilot symbols is indicated in the Fig. by the dotted arrows 410, 420, 430. After the channel quality has been estimated, the UE transmits the corresponding CQI information at the next scheduled reporting time. The transmission of the CQI information over the HS-DPCCH channel is indicated in the Fig. by the arrows 411, 421, 431.

The periodic transmission of the CQI allows the base station to track the variations of quality of the transmission channel and to adapt the transmission parameters (e.g. the transmission power, the coding rate or the modulation order) accordingly. However, the quality of the transmission channel may vary very quickly, especially if the UE is moving at high speed or if a corner effect occurs. If the quality drops between two scheduled CQI reporting times, the base station will be unable to modify the transmission parameters to cope with the poor transmission conditions and the packet error rate will increase in consequence. In order to mitigate this effect, a possible measure would be to adopt a shorter reporting period, at the expense however of a significant increase of the level of interference on the uplink because of the more frequent transmission of the CQI information. Conversely, a similar situation occurs when the quality of the transmission channel improves between two scheduled CQI reporting times: in such a situation, the base station cannot profit from the newly improved transmission conditions until the next report has been received.

SUMMARY OF THE INVENTION

A first object of the invention is therefore to enable a base station to track fast variations of the quality of a transmission channel without unduly increasing the interference level.

A second object of the invention is to enable a base station to cope with a deterioration of the quality of a transmission channel occurring between two scheduled times for reporting a channel quality information.

A subsidiary object of the invention is to enable a base station to profit from an improvement of the quality of a transmission channel occurring between two scheduled times for reporting a channel quality information.

The invention is defined by a method as recited in appended claim 1.

Advantageous embodiments of the invention are defined in the dependent claims.

BRIEF DESCRIPTION OF THE DRAWINGS

The characteristics of the invention mentioned above, as well as others, will emerge more clearly from a reading of the following description in relation to the accompanying figures, amongst which.

DETAILED DISCUSSION OF THE EMBODIMENTS

Figure 5:
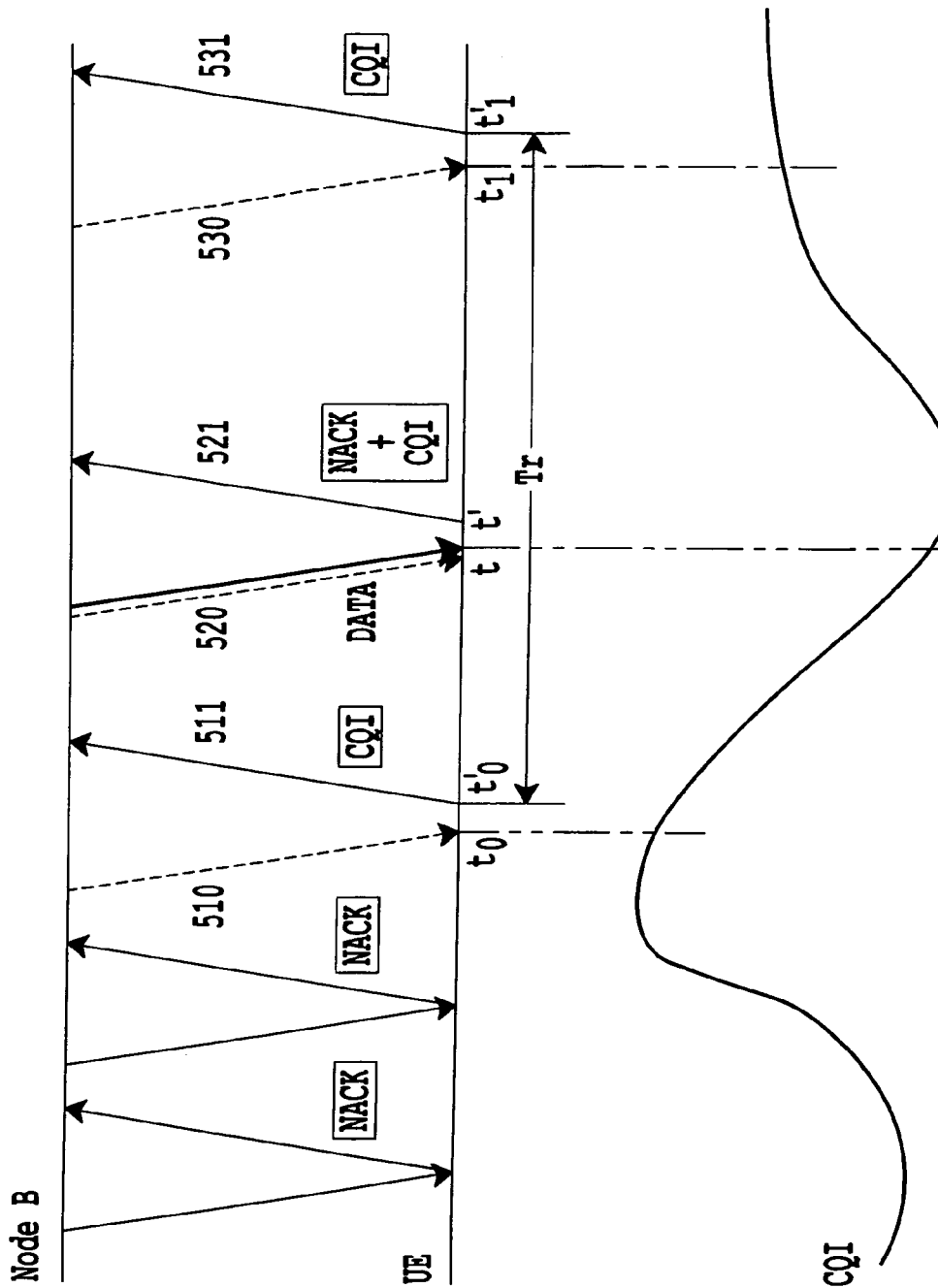
FIG. 5 depicts schematically a process for reporting a channel quality information according to a first embodiment of the invention.

We refer here again to a telecommunication system in which a transmitter (Node B) transmits data subframes over a transmission channel and a receiver (UE) sends back to said transmitter a non-acknowledgement information (NACK) when a received subframe is found erroneous and an acknowledgement information (ACK) when a received subframe is found free of errors. For example, the telecommunication system in question can be a UMTS telecommunication in which an HSDPA access is provided to the mobile terminals. It will be also assumed in the following that the receiver reports to the transmitter at predetermined scheduled times an information representative of the quality of the transmission channel it has estimated. Typically, the receiver will be able to estimate the quality of the transmission channel from received pilot symbols (or known sequences) sent by the transmitter. An example of a time chart of the reporting process according to a first embodiment of the invention has been illustrated in FIG. 5. The times at which the receiver estimates the quality of the transmission channel are denoted as $t_0$, $t_1$ and the scheduled times at which these estimates are reported to the base station are denoted as $t'_0$, $t'_1$. For example, the scheduled times are regularly distributed over time with a periodicity Tr. The transmission of pilot symbols has been represented in the Fig. by doted arrows 510 and 530 and the transmission of the CQI reports by the plain arrows 511 and 531.

Suppose now that the quality of the transmission channel decreases after scheduled time reporting time $t'_0$. The base station will remain unaware of the deterioration of the transmission conditions until time $t'_1$. Furthermore, if the quality of the transmission channel drops and subsequently recovers its original value before $t'_1$, for example if the CQI experiences cyclic drops due to a high fading rate, these variations will be totally ignored by the base station.

Figure 1:
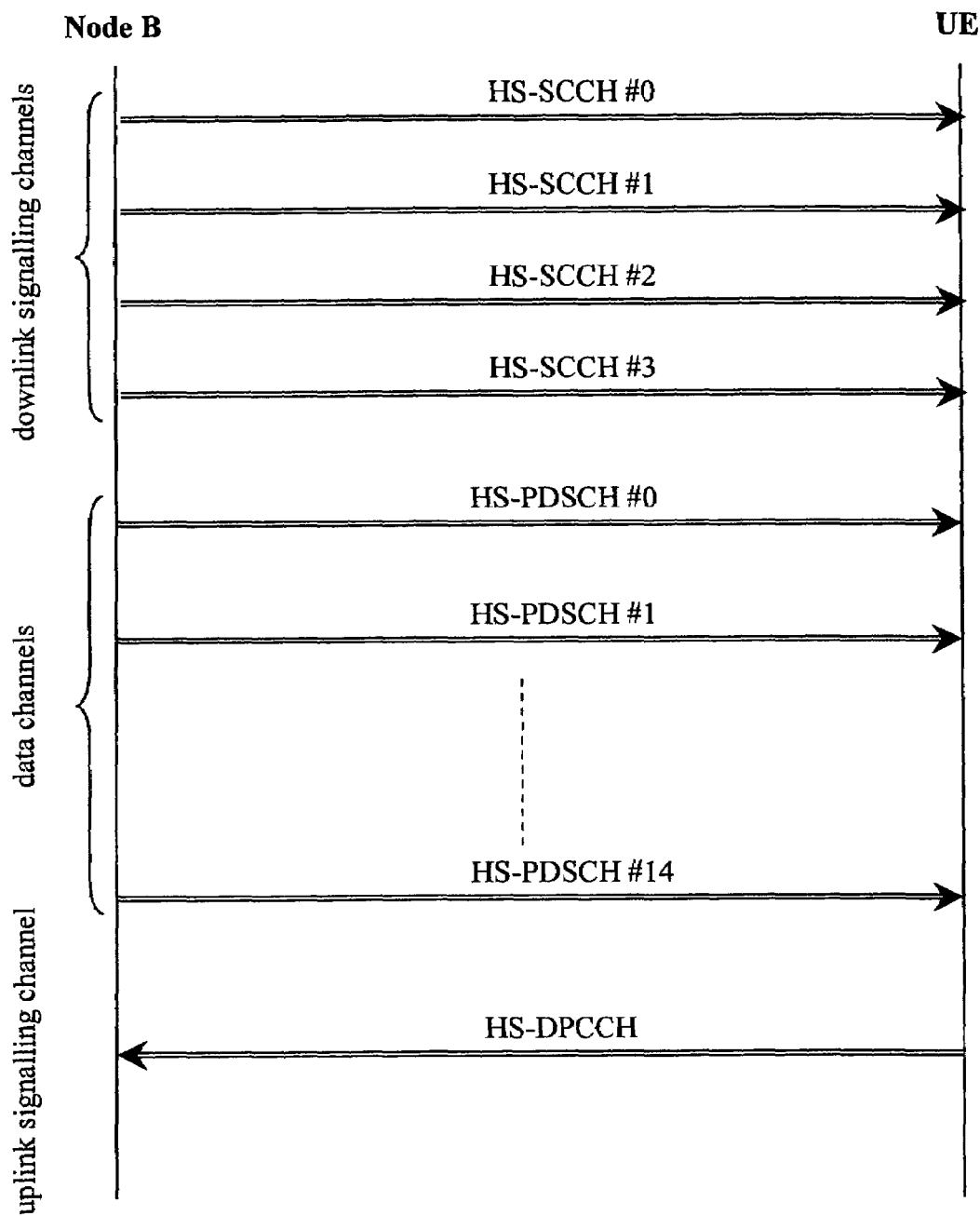
FIG. 1 depicts schematically the structure of an HSDPA access.
Figure 2:
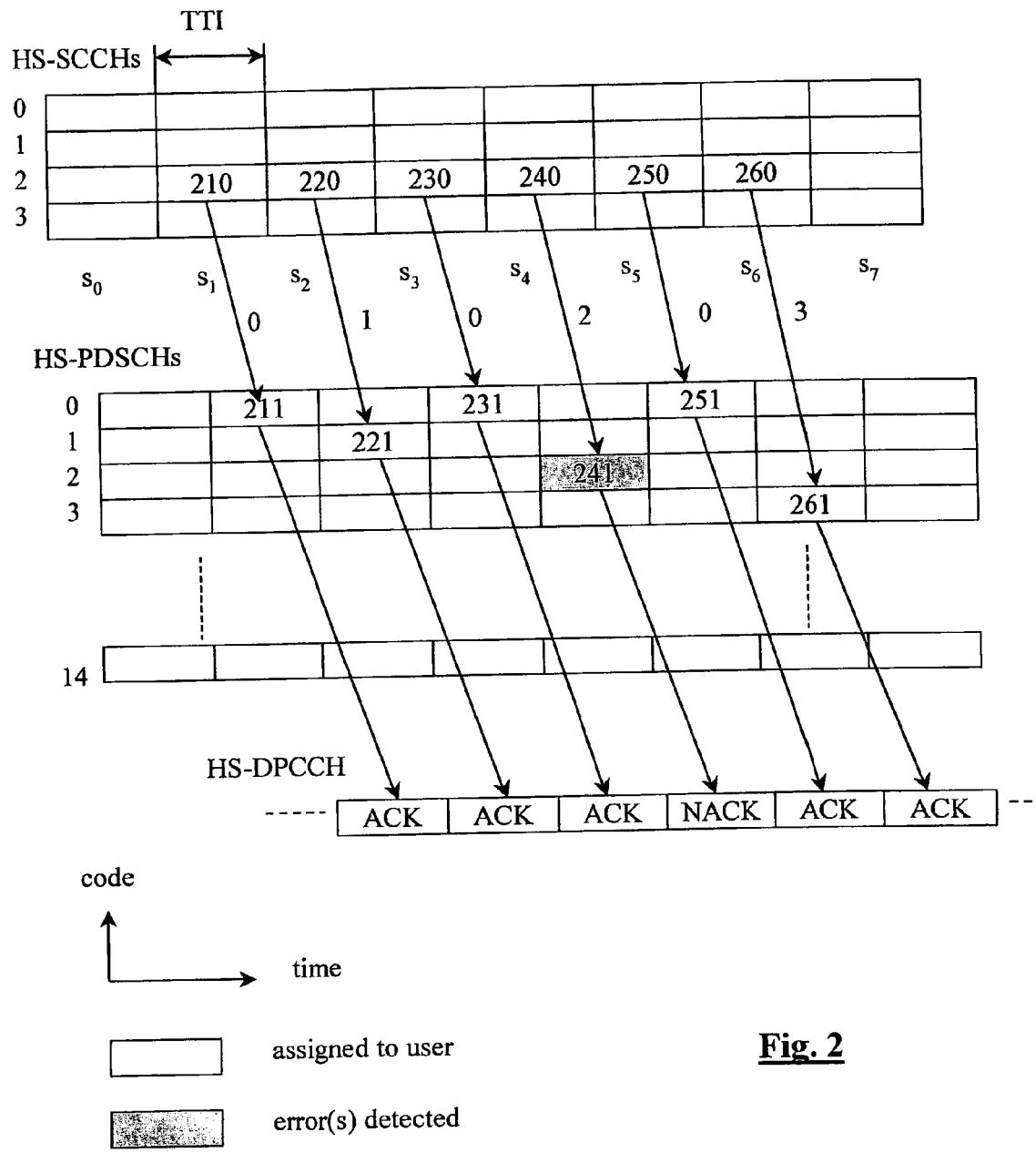
FIG. 2 depicts schematically the process carried out by a user equipment for receiving data from a plurality of downlink shared channels.
Figure 3:
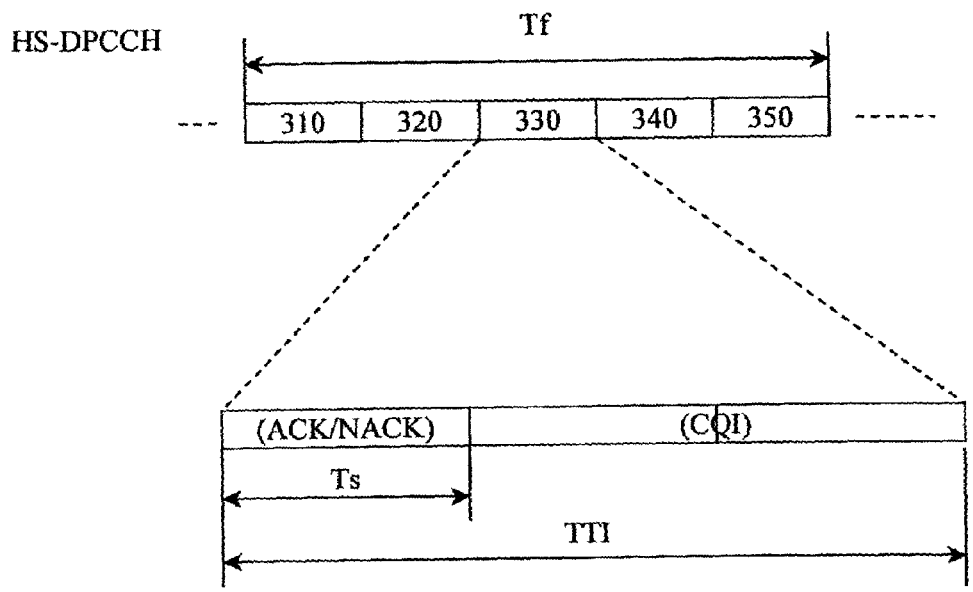
FIG. 3 depicts schematically the frame structure of the HS-DPCCH channel.
Figure 4:
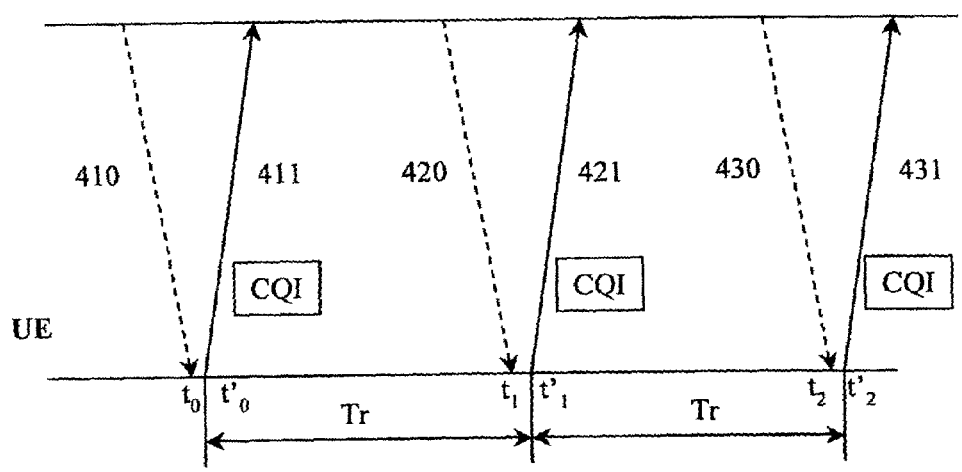
FIG. 4 depicts schematically a known process for reporting a channel quality information.

According to the first embodiment of the invention, the receiver reports to the transmitter an information representative of the quality of the transmission channel when a non-acknowledgement information (NACK) is to be sent. In such instance, the CQI information can be sent together with the non-acknowledgement information in the same subframe as shown in FIG. 3. The detection of an error in a received data subframe (and therefore the subsequent transmission of a NACK) is indeed a clue that the transmission conditions have deteriorated. The situation has been illustrated in FIG. 5 where, at time t the receiver detects an error in a data subframe and consequently sends a non-acknowledgement information at time t'. The thick and the dotted arrows bearing reference number 520 respectively represent the transmission of a data subframe and a pilot symbol (or a known sequence) while the plain arrow 521 represents the transmission of a NACK together with the CQI information. It should be noted that the estimation of the channel quality can itself be triggered by the detection of an erroneous subframe or, alternatively, the channel quality can be systematically estimated, the CQI information thus obtained being only sent in both cases where a subframe is found erroneous.

According to a first variant, the CQI information is not sent with the non-acknowledgement information if the variation of quality of transmission channel lies under a predetermined threshold value δ. This measure avoids to send systematically a CQI information when the quality stays at a low level, thereby preventing an increase of the interference level on the uplink.

According to a second variant, the CQI information is sent only after that a predetermined minimum number of consecutive NACKs have been sent, thus avoiding to take into account spurious quality drops.

An additional advantage of the invention lies in the use of a longer reporting period Tr. Indeed, since a deterioration of the transmission conditions is reported without delay to the transmitter, a high reporting rate is not necessary and, consequently, the level of interference on the uplink can be kept at a low level.

Figure 6:
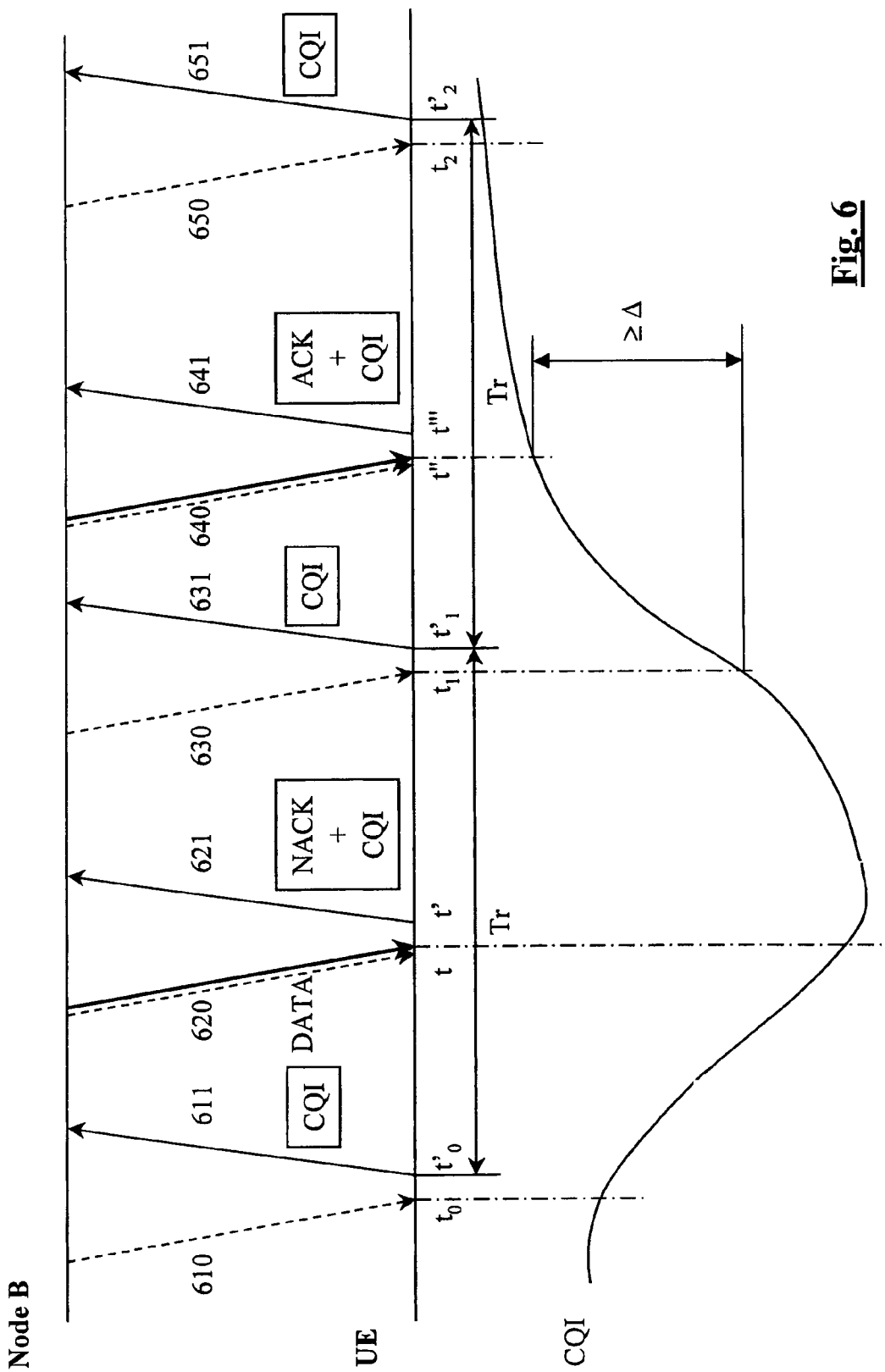
FIG. 6 depicts schematically a process for reporting a channel quality information according to a second embodiment of the invention.

FIG. 6 represents a time chart of a reporting process according to a second embodiment of the invention. Here again the transmission of pilot symbols has been represented by dotted arrows, e.g. 610, 630, 650 the transmission of data by thick arrows, e.g. 620, 640 and the transmission of feedback information by plain arrows, e.g. 611, 621, 631, 641, 651.

According to this embodiment, in addition to systematically reporting a CQI information at the scheduled times $t'_0$, $t'_1$, $t'_2$, etc. and at the times a NACK is sent, e.g. time t', like in the first embodiment, a CQI information is also reported when the quality of the transmission channel improves by at least a predetermined threshold value ($\Delta$). More precisely, if at the time an acknowledgement information is sent back to the transmitter (e.g. time t'''), the transmission channel quality last estimated (here, at time t'') has improved by more than $\Delta$ over the quality last reported (that is, the quality estimated at time t''), the new value of the CQI is transmitted with the ACK information, preferably in the same subframe as shown in FIG. 3.

According to a variant, the CQI information is sent only after the quality improvement has been observed over a predetermined minimum number of consecutive ACKs, thus avoiding to take into account spurious quality surges.

The invention enables the base station to track rapid variations of the quality of the transmission channel. If the reported quality improves, the base station may choose a higher modulation order, a higher channel coding rate or a lower transmission power. Conversely, if the reported quality deteriorates, the base station may choose, in order to maintain the Quality of Service (QoS), a lower modulation rate, a lower channel coding rate or a higher transmission power. In particular, the base station may choose the AMC scheme in accordance with the reported CQI information.

The invention claimed is:

1. A method for reporting a quality of a transmission channel between a transmitter and a receiver, comprising:

transmitting frames of data from said transmitter over said transmission channel to said receiver;

sending back from said receiver to said transmitter a non-acknowledgement information when a frame of data received by said receiver is detected as erroneous;

sending from said receiver to said transmitter, at scheduled reporting times, an information representative of the quality of the transmission channel at said reporting times;

sending in a same subframe the non-acknowledgement information from said receiver back to said transmitter together with information representative of the quality of the transmission channel at a time the non-acknowledgement information is sent, said time being different than said reporting times; and sending said information representative of the quality of the transmission channel together with said non-acknowledgement information when the quality of the transmission channel has deteriorated by at least a predetermined amount over a last reported quality of the transmission channel.

2. A method for reporting a quality of a transmission channel between a transmitter and a receiver, comprising:

transmitting frames of data from said transmitter over said transmission channel to said receiver;

sending back from said receiver to said transmitter a non-acknowledgement information when a frame of data received by said receiver is detected as erroneous;

sending from said receiver to said transmitter, at scheduled reporting times, an information representative of the quality of the transmission channel at said reporting times;

sending in a same subframe the non-acknowledgement information from said receiver back to said transmitter together with information representative of the quality of the transmission channel at a time the non-acknowledgement information is sent, said time being different than said reporting times; and sending back to said transmitter an acknowledgement information when a frame of data received by said receiver is detected as error-free, and if by a time said acknowledgement is sent, the quality of the transmission channel has improved by at least a predetermined amount over a last reported quality of the transmission channel, the receiver additionally sends an information representative of the quality of the information channel at the time the acknowledgement information is sent.

3. The method according to any one of the preceding claims, wherein said transmitter is included in a base station and said receiver is included in a mobile terminal of a telecommunication system provided with HSDPA access.

* * * * *